Dec. 11, 1951     W. P. HOFFERBERT     2,578,247
AUTOMATIC DOOR FOR NESTS
Filed March 28, 1949
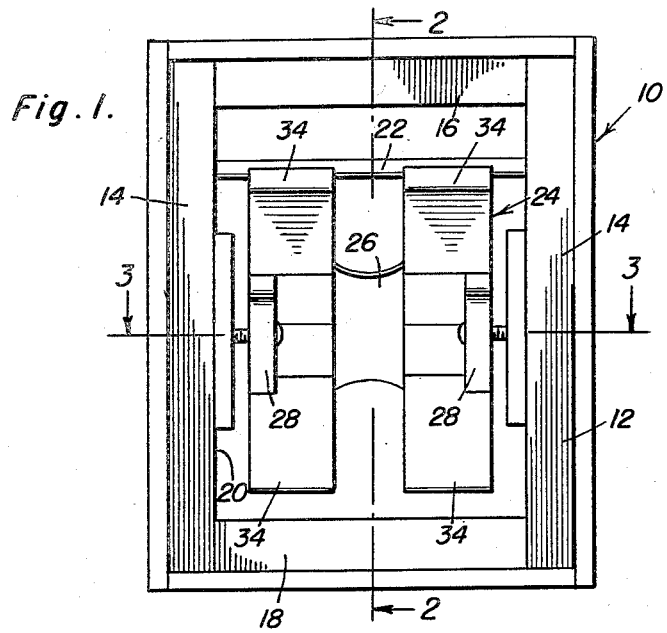
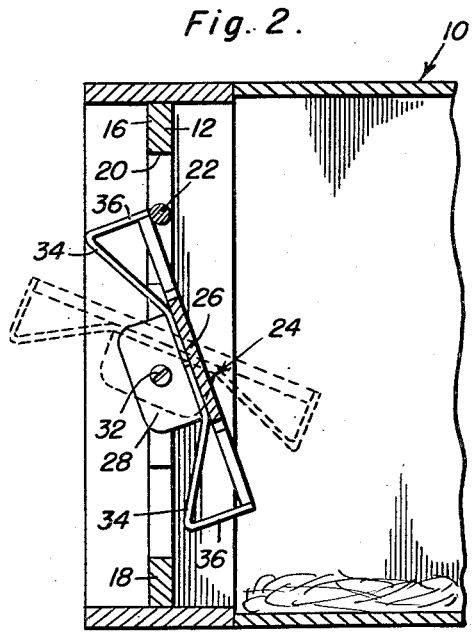
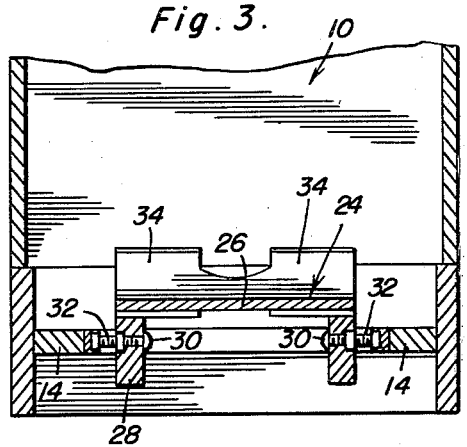
Inventor
William P. Hofferbert Patented Dec. 11, 1951

2,578,247

UNITED STATES PATENT OFFICE 2,578,247

AUTOMATIC DOOR FOR NESTS

William P. Hofferbert, Florence, Ala.

Application March 28, 1949, Serial No. 83,873

1 Claim. (Cl. 20—16)

In the poultry industry, much loss has been suffered because of the tendency on the part of the hens to crowd into an occupied nest so that it has not been infrequent to find a nest occupied by more than one bird.

The primary object of this invention is to improve the production of eggs in the poultry industry, and to avoid the breakage of eggs due to the overcrowding of a nest.

Another object is to assure privacy to a laying hen while she is on the nest, and to prevent intrusion into the nest of other birds.

The above and other objects may be attained by employing this invention which embodies among its features a frame pivotally supported in the doorway of a poultry nest to rotate about a horizontal axis which lies between opposite ends of the frame and intermediate the upper and lower ends of the doorway, means extending across the doorway adjacent one end thereof for engaging alternate ends of the frame to arrest rotary movement of the frame when it attains a substantially vertical position in the doorway, and means carried by the frame and engaging the back of a bird which may be entering or leaving the nest for tilting the frame to a position beyond the horizontal so that the frame will move to doorway closing position under the influence of gravity.

Other features include offsetting the horizontal pivotal support to one side of the frame so that when the frame is tilted beyond the horizontal, it will move by gravity into doorway closing position.

In the drawings:

Figure 1 is a front view of a nest equipped with a door embodying the features of this invention;

Figure 2 is a vertical sectional view taken substantially along the line 2—2 of Figure 1; and Figure 3 is a horizontal sectional view taken substantially along the line 3—3 of Figure 1.

Referring to the drawings in detail, a nest designated generally 10 is equipped with a conventional door frame 12 having the conventional side rails or stiles 14 joined at their upper ends by a conventional lintel 16 and at their lower ends by a conventional sill 18, which stiles, lintel and sill define a vertical doorway 20. Supported adjacent opposite ends in the stiles 14 near the upper end of the doorway 20 and extending transversely thereacross is a stop bar 22.

A door designated generally 24 comprises a substantially H-shaped frame 26 carrying adjacent opposite side edges outwardly extending ears 28 which project perpendicularly from the frame 26 and are provided with aligning openings 30 for the reception of pintles 32 which enter the stiles 14 substantially midway between the upper and lower ends thereof, rotatably to support the frame 26 in the door opening 20. As illustrated in Figures 1 and 2, the pintles 32 are located in the doorway a distance below the stop bar 22 sufficient to permit the frame 26 to engage the stop, as illustrated in Figure 2, when the door 20 is in a substantially vertical position. It is to be noted that the door is rotatably supported about an axis which is offset laterally therefrom so that when it is tilted beyond the horizontal, it will move by gravity into closing relation with the door opening 20.

In order to cause the door to be tilted automatically as a fowl enters or leaves the nest 10, I provide on the side of the door adjacent the ears 28 an outwardly inclined member 34 adjacent each end of each leg of the H-shaped frame 26. The outer ends of the members 34 are held in spaced relation to the opposite ends of the legs of the H-frame 26 by angular extensions 36 which, as illustrated in Figure 2, overlie opposite ends of the legs of the H-frame 26. The opposite ends of the inclined members 34 converge toward the middle portion of the H-frame 26 to provide substantially triangular cam members adjacent each end of the door 24.

In use, a hen entering the nest with the door in the position illustrated in Figure 2 will insert its head and neck between the lowermost legs of the H-frame 26 and, pushing its way through the doorway 20, will cause the door 24 to swing about the axis of the pintles 32, as suggested by the dotted lines in Figure 2. As the hen pushes its way through the doorway beneath the door 24, the cam members 34 will contact the back of the hen and cause the door 24 to be tilted beyond the horizontal so that it will fall by gravity into a reverse position, with what was the lower end of the door in Figure 2 now engaging the stop bar 22. With the parts in this position, a second bird endeavoring to enter the nest will be barred therefrom until such time as the occupant of the nest has left it. In leaving the nest, a reverse operation of the door 24 takes place so that it will fall by gravity into a position substantially as that illustrated in the full lines in Figure 2, ready for a repeat operation. In this way, a bird occupying the nest is assured of continued privacy and entrance to the nest is barred until such time as the nest is vacated.

Segregating the laying hen avoids egg-breaking. Broken eggs soil other eggs that will have to be cleaned. They also soil the nest and require cleaning and refurnishing. Cleaned eggs for market or hatchery are depreciated in value. Broken eggs lead to the egg-eating habit by the hens and can easily result in disaster to the poultry project.

While in the foregoing there has been shown and described the preferred embodiment of this invention, it is to be understood that minor changes in the details of construction, combination and arrangement of parts may be resorted to without departing from the spirit and scope of the invention as claimed.

Having described the invention, what is claimed as new is:

In a poultry nest of the type having a doorway permitting ingress of a fowl, a door for assuring privacy for the occupant of the nest comprising a substantially H-shaped frame, means mounting said frame in said doorway whereby said frame is rotatable in a vertical plane, a stop extending across said doorway adjacent its upper end for engaging said frame and arresting it in a substantially vertical doorway closing position, and means carried by the frame adjacent opposite ends thereof for engaging the back of a fowl entering or leaving the nest to tilt the frame to a position beyond the horizontal whereby said frame will fall by gravity to a doorway-closing position, said means including substantially triangular laterally extending members.

WILLIAM P. HOFFERBERT.

REFERENCES CITED

The following references are of record in the file of this patent:

UNITED STATES PATENTS

| Number | Name | Date |
| --- | --- | --- |
| 264,293 | Householder | Sept. 12, 1882 |
| 271,318 | Downing | Jan. 30, 1883 |
| 938,603 | Miller et al. | Nov. 2, 1909 |
| 1,105,403 | Chapman | July 28, 1914 |
| 1,229,164 | Stith | June 5, 1917 |
| 1,994,208 | Brown | Mar. 12, 1935 |
| 2,105,879 | De Hart | Jan. 18, 1938 |
| 2,118,189 | German | May 24, 1938 |
| 2,299,680 | Carpenter | Oct. 20, 1942 |